US008851658B2

(12) United States Patent
Yamamoto et al.

(10) Patent No.: US 8,851,658 B2
(45) Date of Patent: Oct. 7, 2014

(54) PRINTER AND PRINTING METHOD (75) Inventors: Takaharu Yamamoto, Kyoto (JP); Kazushi Kibune, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 0 days.

(21) Appl. No.: 13/697,327

(22) PCT Filed: May 13, 2011

(86) PCT No.: PCT/JP2011/061019
§ 371 (c)(1),
(2), (4) Date: Nov. 9, 2012

(87) PCT Pub. No.: WO2011/142448
PCT Pub. Date: Nov. 17, 2011

(65) Prior Publication Data
US 2013/0057608 A1    Mar. 7, 2013

(30) Foreign Application Priority Data
May 14, 2010  (JP) ................................. 2010-111974

(51) Int. Cl.
| *B41J 2/01*   | (2006.01) |
| *G02B 3/06*   | (2006.01) |
| *B41J 2/21*   | (2006.01) |
| *G02B 3/00*   | (2006.01) |
| *G02B 27/22*  | (2006.01) |
| *B29D 11/00*  | (2006.01) |
| *B41M 3/06*   | (2006.01) |

(52) U.S. Cl.
CPC  *G02B 3/005* (2013.01); *G02B 3/06* (2013.01); *B41J 2/2114* (2013.01); *G02B 27/2214* (2013.01); *G02B 35/24* (2013.01); *B29D 11/00278* (2013.01); *B41M 3/06* (2013.01)
USPC ......................................... 347/102

(58) Field of Classification Search
CPC ....... B41J 2/2114; B41J 11/001; B41J 11/002
USPC ............................... 347/9, 101, 102, 105, 106
See application file for complete search history.

(56) References Cited

U.S. PATENT DOCUMENTS

| 8,424,993 B2 * | 4/2013 | Ikehata et al. .................. 347/16 |
| 2004/0201660 A1 | 10/2004 | Nishikawa et al. |
| 2011/0157272 A1 | 6/2011 | Ikehata et al. |

FOREIGN PATENT DOCUMENTS

| JP | 11-188866 | 7/1999 |
| JP | 2003-011350 | 1/2003 |
| JP | 2006-001153 | 1/2006 |
| JP | 2007-144635 | 6/2007 |
| JP | 2009-113430 | 5/2009 |
| WO | 2007/033031 A2 | 3/2007 |

* cited by examiner

*Primary Examiner* — An Do
(74) *Attorney, Agent, or Firm* — Dorsey & Whitney LLP (57) ABSTRACT

The present invention provides a printer and printing method that forms a lenticular lens or a transparent structure based on pseudo-embossment printing or the like on paper having penetrability, and an inkjet printer performs: with respect to a base material having a characteristic of being penetrated by radiation-curable ink, an undercoating step of using radiation-curable transparent ink to form a thin undercoat layer; an undercoat curing step of irradiating the formed undercoat layer with radiation to completely solidify the thrilled undercoat layer; a transparent structure forming step of using the radiation-curable transparent ink to form a spacer layer and microlens layer as a desired transparent structure on the solidified undercoat layer; and a transparent structure curing step of afterward further irradiating the radiation to cure the formed spacer layer and microlens layer.

10 Claims, 10 Drawing Sheets

PRINTER AND PRINTING METHOD

TECHNICAL FIELD

The present invention relates to a printer and printing method for forming a printed material having an uneven shape on a print side, and more particularly, to a printer and printing method for performing, for example, 3D printing that forms a lenticular lens on a print side, or pseudo-embossment printing that forms unevenness on a print side.

BACKGROUND ART

There have been proposed so-called 3D printing that forms a lenticular lens on a print side, and pseudo-embossment printing that forms unevenness on a print side. The 3D printing refers to a printing technique for a printed material in which a lenticular lens is formed on a print side to provide a stereoscopic effect to an image, or an image is made different depending on an angle to see, and as the 3D printing, techniques disclosed in Patent literatures 1 and 2 are known. The pseudo-embossment printing refers to a printing technique that attempts to form unevenness on a print side to express a stereoscopic effect, a luxurious feel, or the like, and as the pseudo-embossment printing, a technique disclosed in Patent literature 3 is known. Any of them is a technique that attempts to form a predetermined shaped structure on a print side with the printing technique. Also, the structure formed in a printing step is desirably solidified early in terms of productivity, and therefore ultraviolet-curable ink is used for the printing, and after the printing, ultraviolet is irradiated to solidify the ink.

CONVENTIONAL TECHNIQUE LITERATURE

Patent Literature

[Patent literature 1] JPA H11-188866
[Patent literature 2] JPA 2007-144635
[Patent literature 3] JPA 2009-113430

SUMMARY OF THE INVENTION

Problem to Be Solved by the Invention

In the 3D printing or pseudo-embossment printing as described above, in order to form a predetermined shaped structure on a print side with ink, the ink having an amount necessary to form the structure should be supplied to the print side, and therefore a large amount of ink as compared with the case of printing a general pattern is supplied to the print side. Meanwhile, in the case of using the ultraviolet-curable ink to perform printing as described above, if plain paper is used as a printing object, the ink supplied in large amounts penetrates inside of the paper. If this occurs, even if an attempt to irradiate a surface of the paper with ultraviolet to cure the ink is made after the printing, the ultraviolet does not reach the ink penetrating inside of the paper to prevent the ink from being completely cured, and therefore a blot onto a back surface of the paper, or an unusual odor due to incompletely cured ink occurs.

The present invention is made in consideration of the above problem, and intended to provide a printer and printing method that can form a lenticular lens for the 3D printing or a transparent structure for the pseudo-embossment printing even on paper having ink penetrability such as plain paper, and prevent a blot onto a back surface or an unusual odor due to ink from occurring.

Means Adapted to Solve the Problem

An invention according to a first aspect of the present invention is a printing method provided with: with respect to printing paper having a characteristic of being penetrated by radiation-curable ink, an undercoating step of using radiation-curable transparent ink to form a thin undercoat layer; an undercoat curing step of irradiating the formed undercoat layer with radiation to completely solidify the formed undercoat layer; a transparent structure forming step of using the radiation-curable transparent ink to form a desired transparent structure on the solidified undercoat layer; and a transparent structure curing step of afterward further irradiating the radiation to cure the formed transparent structure.

An invention according to a second aspect of the present invention is the printing method according to the first aspect, wherein the transparent structure is a lenticular lens or a pseudo-embossment.

An invention according to a third aspect of the present invention is the printing method according to the first or second aspect, wherein the transparent structure curing step is provided with: a first curing step of irradiating relatively weak radiation to shape the transparent structure as being in a semi-cured state; and a second curing step of, after the first curing step, irradiating relatively strong radiation to completely cure the transparent structure.

An invention according to a fourth aspect of the present invention is the printing method according to the first aspect, wherein the undercoat layer has a thickness of 10 μm or less.

An invention according to a fifth aspect of the present invention is a printer provided with: an ejection part that ejects a microdroplet of radiation-curable transparent ink toward a base material; a moving mechanism that moves the ejection part and the base material relative to each other; a curing part that irradiates the transparent ink provided on the base material from the ejection part with radiation to cure the transparent ink; and a print control part that controls the ejection part, the moving mechanism, and the curing part, wherein the print control part is provided with: a transparent structure formation control part that supplies a predetermined amount of the transparent ink to the base material, then irradiates the transparent ink with radiation to cure the transparent ink, and thereby forms a transparent structure on the base material; and an undercoat layer formation control part that supplies to the base material the transparent ink having a smaller amount than the predetermined amount in the transparent structure formation control part, then irradiates the transparent ink with radiation to cure the transparent ink, and thereby forms an undercoat layer of the transparent ink on the base material.

An invention according to a sixth aspect of the present invention is a printer provided with: an undercoat layer forming part that has a first supply part supplying radiation-curable transparent ink to a base material, and a first curing part irradiating the transparent ink supplied by the first supply part with radiation to cure the transparent ink, and forms an undercoat layer based on the transparent ink; a transparent structure forming part that has a second supply part ejecting a microdroplet of radiation-curable transparent ink toward the base material, and a second curing part irradiating the transparent ink ejected by the second supply part with radiation to cure the transparent ink, and forms a transparent structure based on the transparent ink, a moving mechanism that moves the undercoat layer forming part and the transparent structure forming part relative to the base material; and a print control part that controls the undercoat layer forming part, the transparent structure forming part, and the moving mechanism, wherein the print control part is provided with: a transparent structure formation control part that supplies a predetermined amount of the transparent ink from the transparent structure forming part to the base material, then irradiates the transparent ink with the radiation to cure the transparent ink, and thereby forms the transparent structure on the base material; and an undercoat layer formation control part that supplies the transparent ink having a smaller amount than the predetermined amount by the transparent structure formation control part from the undercoat layer forming part to the base material, then irradiates the transparent ink with the radiation to cure the transparent ink, and thereby forms the undercoat layer of the transparent ink on the base material.

An invention according to a seventh aspect of the present invention is the printer according to the fifth aspect, wherein: the transparent structure has a lens layer including a spacer layer and a microlens layer; and intensity of the radiation irradiated from the curing part at a time of forming the microlens layer is smaller than intensity of the radiation irradiated from the curing part at a time of forming the spacer layer.

An invention according to an eighth aspect of the present invention is the printer according to the sixth aspect, wherein: the transparent structure has a lens layer including a spacer layer and a microlens layer; and intensity of the radiation irradiated from the second curing part at a time of forming the microlens layer is smaller than intensity of the radiation irradiated from the second curing part at a time of forming the spacer layer.

An invention according to a ninth aspect of the present invention is the printer according to the fifth or sixth aspect, further provided with another ejection part that ejects a microdroplet of colored ink toward the base material to form an image layer.

Effects of the Invention

According to the printer and printing method of the present invention, even on paper having ink penetrability such as plain paper, the formation of a lenticular lens for the 3D printing or the formation of a transparent structure for the pseudo-embossment printing can be performed, and also a blot onto a back surface or an unusual odor due to UV ink can be prevented from occurring.

EMBODIMENTS OF THE INVENTION

Figure 1:
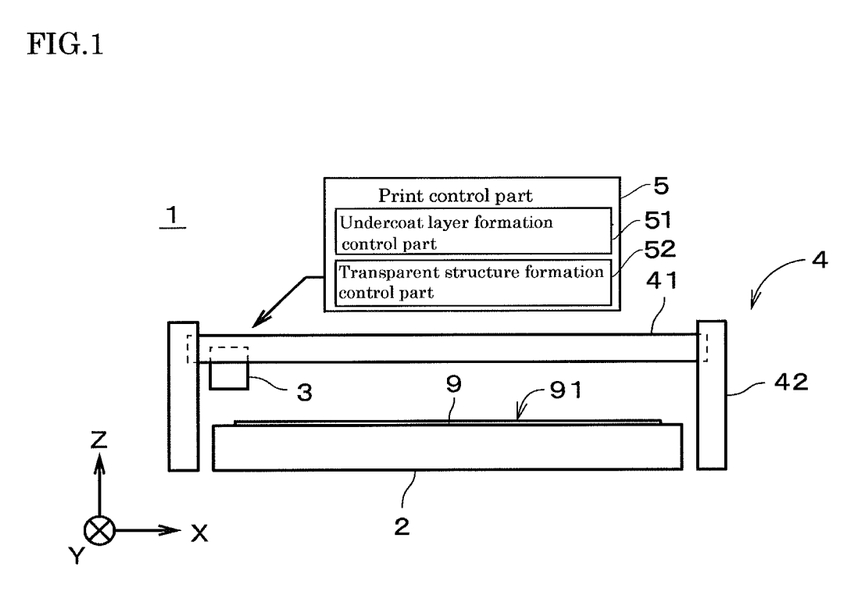
FIG. 1 is a front view of an inkjet printer according to a first embodiment.

FIG. 1 is a front view illustrating an inkjet printer 1 as a printer according to a first embodiment of the present invention. The inkjet printer 1 is a device that performs color printing based on an inkjet method on a principal surface 91 (hereinafter referred to as an "upper surface 91") on a (+Z) side of a base material 9 (e.g., a piece of plain paper) having penetrability for ink. The base material 9 printed with an image is used for, for example, a catalogue, a magazine, particularly, a front cover of a magazine, or the like.

As illustrated in FIG. 1, the inkjet printer 1 is provided with: a holding part 2 that holds the base material 9; a head unit 3 that ejects microdroplets of ink toward the base material 9; a head moving mechanism 4 that moves the head unit 3; and a print control part 5 that controls operation of each of such components, and the like. The head moving mechanism 4 is provided with: a main scanning mechanism 41 that moves the head unit 3 in an X direction corresponding to a main scanning direction; and a sub scanning mechanism 42 that moves the head unit 3 in a Y direction (hereinafter referred to as a "sub scanning direction") that is vertical and horizontal to the X direction. Also, the print control part 5 has: an undercoat layer formation control part 51 that controls operation for forming an undercoat layer 94; and a transparent structure formation control part 52 that controls operation for forming a lens layer 95 including a lenticular lens that is a transparent structure, both of which will be described later.

Figure 2:
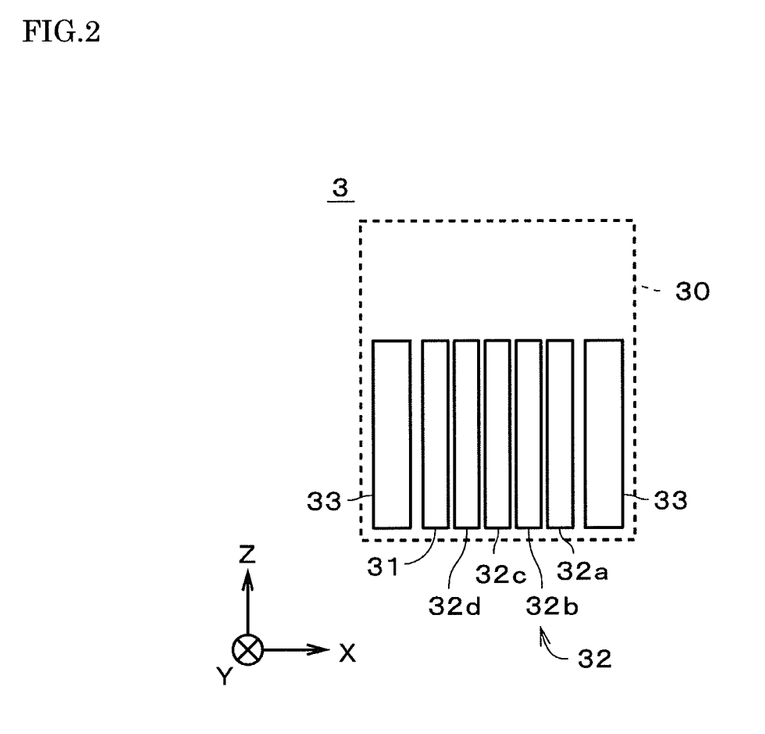
FIG. 2 is a diagram illustrating an internal configuration of a head unit.

FIG. 2 is a diagram illustrating an internal configuration of the head unit 3. In FIG. 2, a cover 30 of the head unit 3 is drawn by a dashed line. The head unit 3 is provided with: an ejection part 31 (hereinafter referred to as a "transparent ink ejection part 31") that ejects microdroplets of transparent ink toward the base material 9; another ejection part 32 (hereinafter referred to as a "colored ink ejection part 32") that ejects microdroplets of colored ink toward the base material 9; and two curing parts 33 that are arranged on both sides of the transparent ink ejection part 31 and colored ink ejection part 32 in the X direction. The transparent ink ejection part 31 is arranged on a (−X) side of the colored ink ejection part 32, and has a plurality of ejection ports each from which the transparent ink is ejected.

The colored ink ejection part 32 is provided with four ejection mechanisms 32a to 32d arrayed in the X direction, and each of the ejection mechanisms 32a to 32d has a plurality of ejection ports as with the transparent ink ejection part 31. In the colored ink ejection part 32, the ejection mechanism 32a that is positioned on the most (+X) side (rightmost side) in FIG. 2 ejects K (black) colored ink; the ejection mechanism 32b on a (−X) side of the ejection mechanism 32a ejects C (cyan) colored ink; the ejection mechanism 32c on a (−X) side of the ejection mechanism 32b ejects M (magenta) colored ink; and the ejection mechanism 32d on a (−X) side of the ejection mechanism 32c ejects Y (yellow) colored ink.

The transparent ink is radiation-curable flexible ink, and the colored inks are also radiation-curable inks. The curing parts 33 irradiate the transparent ink and colored ink provided on the base material 9 from the transparent ink ejection part 31 and colored ink ejection part 32 with radiation to cure the transparent ink and colored ink. In the present embodiment, as the transparent ink and colored ink, ultraviolet-curable inks are used, and as each of the curing parts 33, a component that emits ultraviolet as the radiation is used; however, for example, electron beam-curable ink may be used, and as each of the curing parts 33, a component that emits electron beams may be used.

Figure 3:
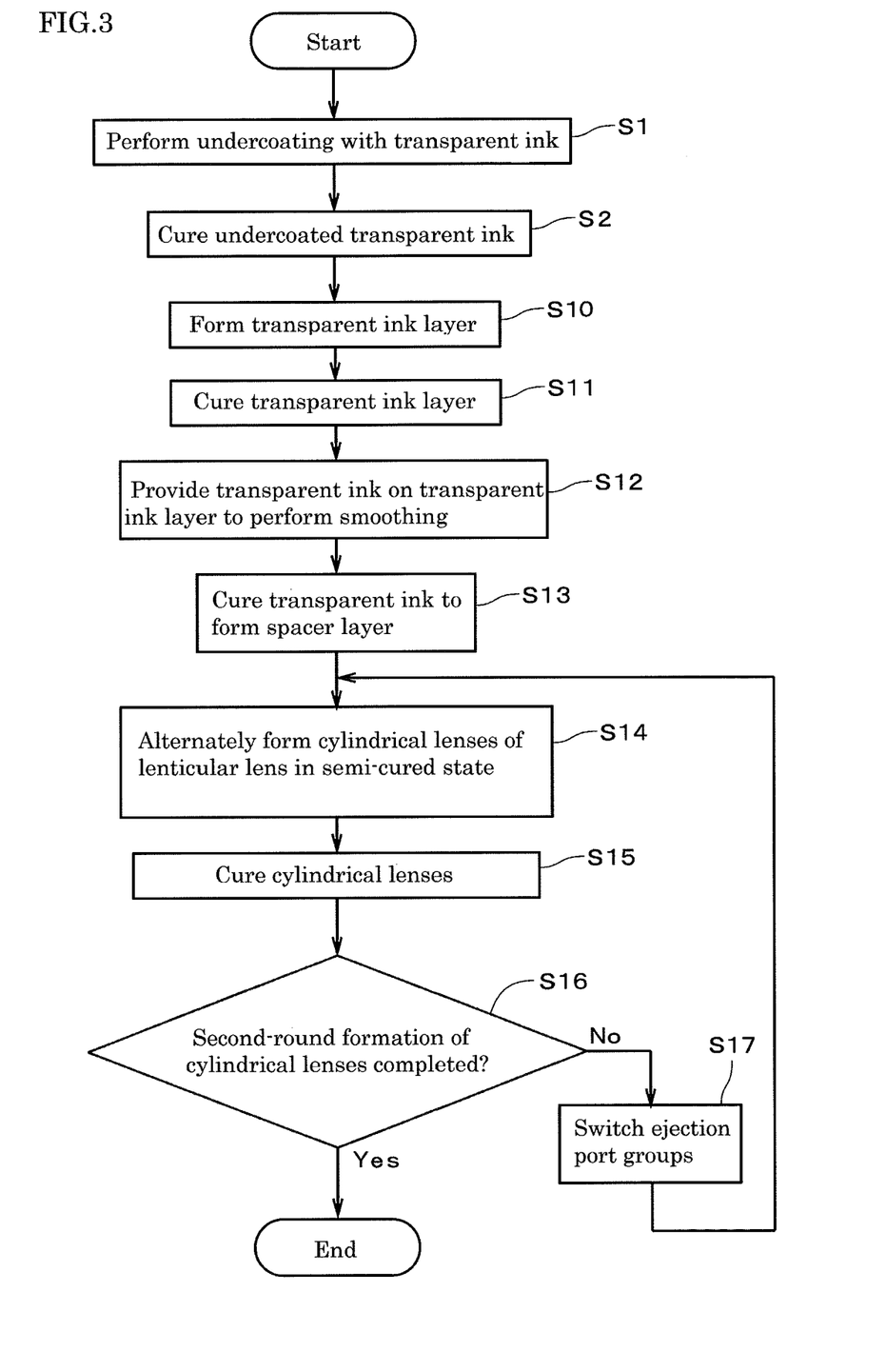
FIG. 3 is diagram illustrating a flow of the formation of a lens layer.
Figure 4:
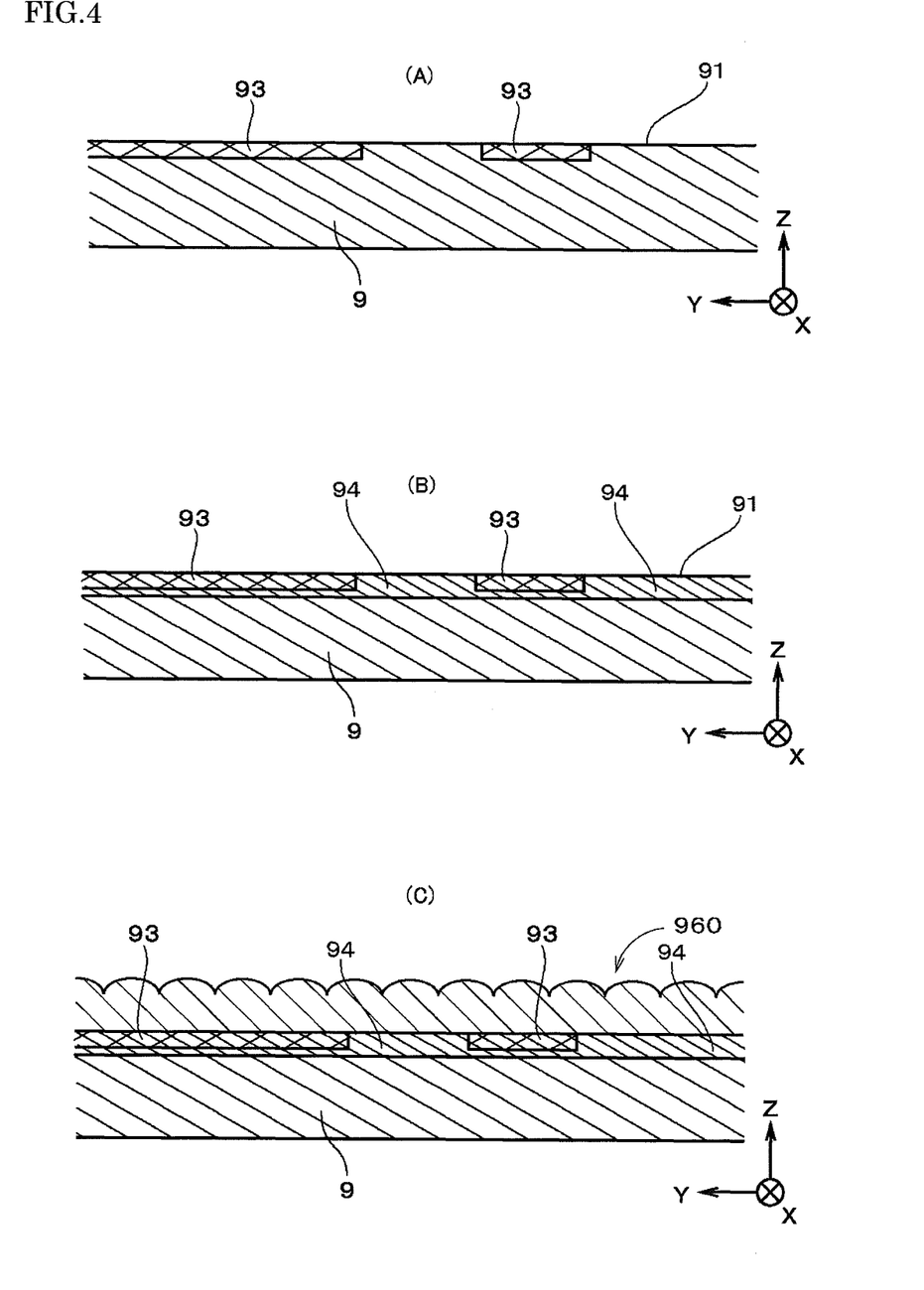
FIG. 4 is a cross-sectional view illustrating a formation step of the lens layer.
Figure 5:
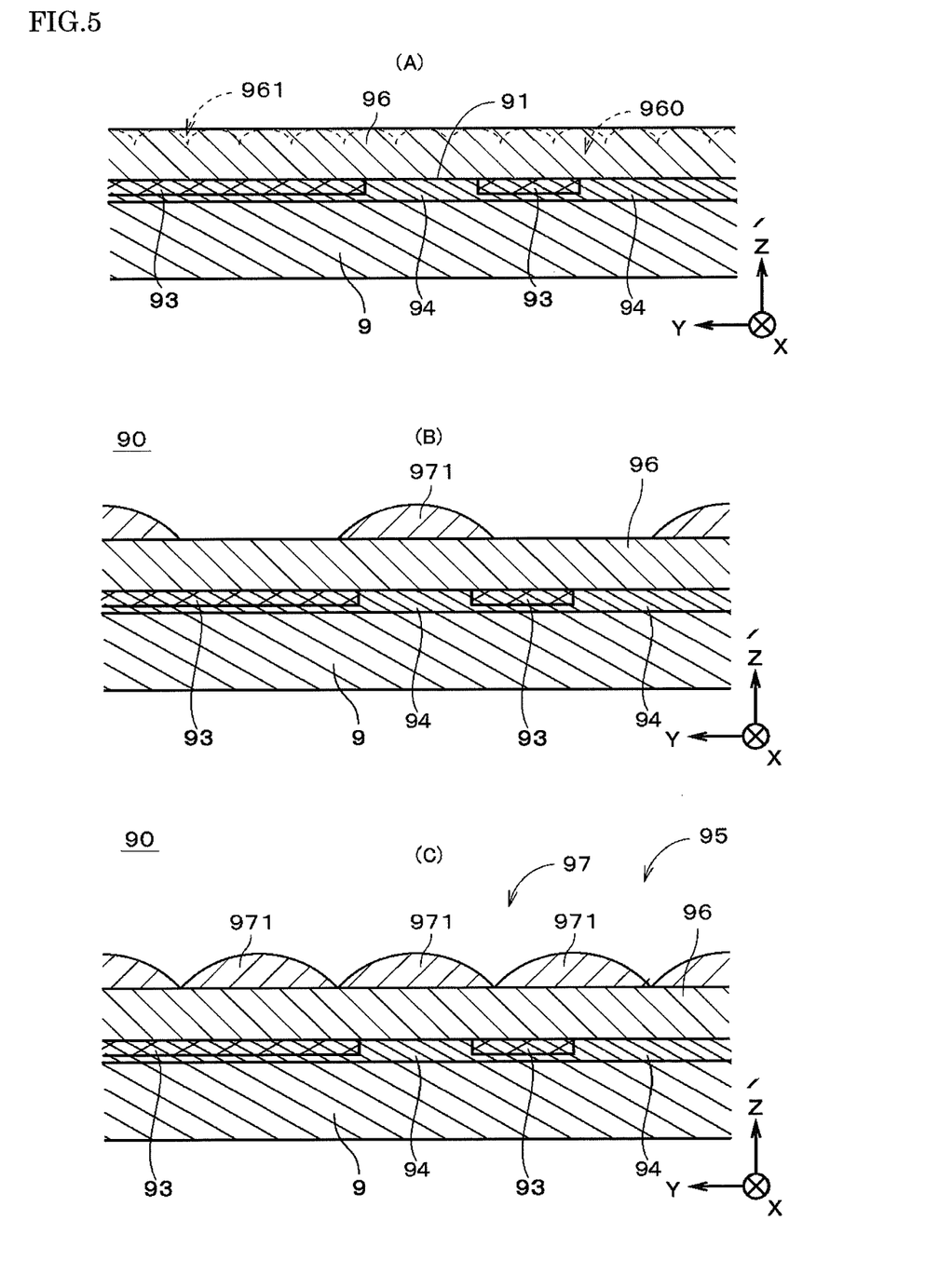
FIG. 5 is a cross-sectional view illustrating the formation step of the lens layer.

Next, referring to FIGS. 3 to 5, a method for 3D printing that forms a lenticular lens on a print side is described. In the description, the base material 9 serving as a printing object is a piece of plain paper having penetrability for ink, and on a surface of the base material 9, a multi-view image is preliminarily printed. A cross section of the base material 9 is illustrated in FIG. 4 (A). The multi-view image is an image that forms a 3D image corresponding to the lenticular lens to be formed from now, and printed with general ink, for example, oil-based or water-based ink with use of another printer or the like and dried in advance, and the ink in printed parts penetrates through the base material 9 to form an image layer 93 as illustrated in FIG. 4 (A).

In order to form the lenticular lens on the base material 9 illustrated in FIG. 4 (A) with the inkjet printer 1, the print control part 5 controls the respective parts according to a flow illustrated in FIG. 3. That is, first, from the transparent ink ejection part 31, the transparent ink is ejected onto the whole of the base material 9 to perform printing so as to have a thin and uniform thickness (Step S1). The transparent ink penetrates through the base material 9 (including the image layer 93) as illustrated in FIG. 4 (B), and forms the undercoat layer 94 on the surface of the base material 9. Then, the ultraviolet is irradiated by the curing part 33 through which the base material 9 passes immediately after the ejection for forming the undercoat layer 94, and thereby the undercoat layer 94 is completely cured (Step S2). Note that the undercoat layer 94 has the very thin thickness, e.g., equal to or less than 10 μm, and is formed only in the vicinity of the surface of the base material 9, so that the undercoat layer 94 can be completely cured by the ultraviolet irradiation from above. In addition, Steps S1 and S2 are substantially almost simultaneously performed on the basis of operation of repeating the X direction main scanning and Y direction sub scanning of the transparent ink ejection part 31 and curing part 33. Also, the operation (Steps S1 and S2) for forming the undercoat layer 94 is controlled by the undercoat layer formation control part 51 in the print control part 5 illustrated in FIG. 1. Further, in FIG. 4 (B), the undercoat layer 94 is illustrated as if the transparent ink completely penetrates inside of the base material 9 (including the image layer 93) to form the undercoat layer 94 only inside the base material 9; however, in practice, a thin layer only made of the transparent ink may be formed on the surface of the base material 9 as well. Even in such a case, the transparent ink on the surface of the base material 9 is solidified without any problem. Also, the same holds for the case where the image layer 93 is formed on the surface of the base material 9.

Subsequently, the lens layer 95 including the lenticular lens having a thickness of approximately 300 μm is formed. The lens layer 95 is provided with: a spacer layer 96 that has an approximately uniform thickness (approximately 150 μm) over the entire area; and a microlens layer 97 (see FIG. 5) that is arranged on the spacer layer 96. First, on the undercoat layer 94 (including the image layer 93) formed on the base material 9, microdroplets of the transparent ink are provided, and as illustrated in FIG. 4 (C), a main body part 960 of the spacer layer 96 is formed (Step S10). Then, the ultraviolet is irradiated by the curing part 33 (see FIG. 2) to thereby cure the main body part 960 (Step S11). In addition, Steps S11 and S12 are also substantially almost simultaneously performed on the basis of the operation of repeating the X direction main scanning and Y direction sub scanning of the transparent ink ejection part 31 and curing part 33. A surface of the main body part 960 has unevenness because a center of a position where each of the microdroplets of the transparent ink is placed rises higher than surrounding positions. Here, in order to make the spacer layer 96 have a predetermined thickness, the transparent ink may be ejected to respective positions of the image layer 93 and cured a plurality of times as needed. That is, Steps S10 and S11 may be performed a plurality of times.

Subsequently, after the irradiation of the ultraviolet from the curing part 33 in Step S11 has been stopped, microdroplets of the transparent ink are provided on the main body part 960 over the entire surface. The microdroplets of the transparent ink provided on the main body part 960 spread around, and as illustrated in FIG. 5 (A), flow into concave portions of the surface of the main body part 960 to form into a surface layer 961 of the spacer layer 96 (Step S12). A surface of the surface layer 961 becomes a smooth surface that is positioned at a uniform height from the upper surface 91 of the base material 9 over the entire surface. Then, the ejection of the transparent ink is stopped; the ultraviolet is irradiated from the curing part 33 to cure the surface layer 961 on the main body part 960; and thereby the spacer layer 96 having a smooth surface and an approximately uniform thickness is formed on the image layer 93 (Step S13). In addition, in Step S12, the ultraviolet from the curing part 33 is not irradiated onto the transparent ink provided on the main body part 960; however, the ultraviolet may be irradiated at small intensity (i.e., smaller intensity than intensity of the ultraviolet irradiated at the time of forming the main body part 960) to the extent that prevents fluidity of the transparent ink from being lost.

Then, the main scanning of the head unit 3 is performed in a state where, on the assumption that, in the transparent ink ejection part 31 (see FIG. 2), one or more ejection ports corresponding to one cylindrical lens 971 (see FIG. 5) are defined as an ejection port group, the transparent ink is ejected from ejection groups odd-numbered from a (−Y) side of the transparent ink ejection part 31 and at the same time the ejection of the transparent ink from even-numbered ejection port groups is stopped. Subsequently, the transparent ink provided on the spacer layer 96 from the odd-numbered ejection groups is irradiated with the ultraviolet from the curing part 33, and thereby as illustrated in FIG. 5 (B), a plurality of cylindrical lenses 971 extending in the main scanning direction (X direction are formed (Step S14). The plurality of cylindrical lenses 971 are arrayed in the Y direction with being separated from each other, and a distance in the Y direction between two adjacent cylindrical lenses 971 (i.e., a Y direction distance of an area where the spacer layer 96 is exposed) is approximately the same as a width of each of the cylindrical lenses 971 in the Y direction.

In Step S14, the intensity of the ultraviolet irradiated from the curing part 33 is smaller than the intensity of the ultraviolet irradiated from the curing part 33 at the time of forming the main body part 960 of the spacer layer 96, and therefore the transparent ink ejected onto the spacer layer 96 is in a state of being cured to some extent but having fluidity (hereinafter referred to as a "semi-cured state"). For this reason, a plurality of transparent ink dots arrayed in the X direction in an area corresponding to one cylindrical lens 971 are connected to each other (i.e., fit in adjacent dots). This prevents a surface of each of the cylindrical lenses 971 from becoming uneven in the X direction that is a longer direction of the cylindrical lens 971, and thereby a smooth curved surface is formed. Also, the transparent ink dots in the semi-cured state also spread in the Y direction, and therefore a Y direction width of a microdroplet of the transparent ink ejected from the transparent ink ejection part 31 is made smaller than a design width of each of the cylindrical lenses 971. In the present embodiment, the intensity of the ultraviolet irradiated from the curing part 33 in Step S14 is approximately 5% to 20% (preferably, approximately 5% to 10%) of the intensity of the ultraviolet irradiated from the curing part 33 at the time of forming the spacer layer 96.

When the surface shape of each of the cylindrical lenses 971 becomes a desired shape, the head unit 3 is scanned with the ejection of the transparent ink from the transparent ink ejection part 31 being stopped, and the cylindrical lenses 971 in the semi-cured state are irradiated with the ultraviolet from the curing part 33 to cure the cylindrical lenses 971 (Step S15). Intensity of the ultraviolet irradiated from the curing part 33 in step S15 is larger than the intensity of the ultraviolet in Step S14, and equal to the intensity of the ultraviolet at the time of forming the spacer layer 96. In the inkjet printer 1, in order to make the cylindrical lenses 971 have a predetermined thickness, Steps S14 and S15 may be repeated a plurality of times as needed.

Subsequently, in the transparent ink ejection part 31, the ejection groups ejecting the transparent ink are switched (Steps S16 and S17). That is, the ejection of the transparent ink from the ejection groups odd-numbered from the (−Y) side is stopped, and ejection of the transparent ink from the even-numbered ejection groups is started. Then, the flow returns to Step S14, and a second round of Steps S14 and S15 is performed, whereby as illustrated in FIG. 5 (C), a plurality of cylindrical lenses 971 are formed on the spacer layer 96 between the plurality of cylindrical lenses 971 formed in the first round of Steps S14 and S15, and as illustrated in FIG. 5 (C), the formation of the microlens layer 97 is completed (i.e., the formation of the lens layer 95 is completed) (Steps S14 to S16). Any of the cylindrical lenses 971 formed in the second round is in contact in the Y direction with adjacent two of the cylindrical lenses 971 formed in the first round. By the above steps, as illustrated in FIG. 5 (C), the lens layer 95 based on the transparent ink is formed on the image layer 93 on the base material 9. In addition, the operation for forming the lens layer 95 (Steps S10 to S17) is controlled by the transparent structure formation control part 52 in the print control part 5. The lens layer 95 is the lenticular lens having the thickness of approximately 300 μm, and provided with: the spacer layer 96 that is formed on the image layer 93 so as to have the predetermined thickness; and the microlens layer 97 that is arranged on the spacer layer 96. The thickness of the spacer layer 96 is almost uniform over the entire area of the lens layer 95, and in the present embodiment, approximately 150 μm. The microlens layer 97 has the plurality of cylindrical lenses 971 arrayed in the predetermined array direction (Y direction). By the above-described steps, the formation of a printed material 90 provided with the base material 9, image layer 93, and lens layer 95 is completed.

As described above, to use the inkjet printer 1 to form the lenticular lens on the base material 9 having penetrability for ink, the transparent ink is first ejected from the transparent ink ejection part 31 onto the whole of the base material 9 to form the undercoat layer 94 on the surface of the base material 9, and the undercoat layer 94 is irradiated with the ultraviolet and thereby completely cured, so that even if a large amount of transparent ink is subsequently supplied to the base material 9 to form the lenticular lens, the transparent ink does not penetrate through the base material 9 but contributes to the formation of the lenticular lens on the surface of the base material 9. Accordingly, the inconvenience that such a large amount of transparent ink penetrates through the base material 9 and runs on a back surface, or the ink penetrating inside of the base material 9 is not completely solidified to release an unusual odor does not occur. In addition, the undercoat layer 94 is only required to have a thickness that can prevent the transparent ink at the time of forming the lenticular lens from penetrating through the base material 9 more than necessary, and in FIG. 4, the undercoat layer 94 is illustrated as being thicker than the image layer 93, but may be thinner.

Also, in such formation of the printed material 90 by the inkjet printer 1, by providing the spacer layer 96 between the microlens layer 97 and the image layer 93, a distance in a thickness direction between the surfaces of the plurality of cylindrical lenses 971 and the image layer 93 can be increased to easily focus the plurality of cylindrical lenses 971 of the microlens layer 97 on the image layer 93. This enables an image in the image layer 93 to be clearly seen through the lens layer 95. Also, by forming the microlens layer 97 on the smooth surface of the spacer layer 96, without any influence of a surface shape of the image layer 93, the lenticular lens (i.e., the lens layer 95) having the plurality of cylindrical lenses 971 each having a desired surface shape can be easily formed. As a result, a visual effect such as providing a stereoscopic effect to an image, or making an image different depending on an angle to see can be easily provided to the image on the base material 9.

In the formation of the printed material 90 by the inkjet printer 1, the intensity of the ultraviolet irradiated from the curing part 33 at the time of forming the microlens layer 97 is smaller than the intensity of the ultraviolet irradiated from the curing part 33 at the time of forming the main body part 960 of the spacer layer 96. This prevents the surface of each of the cylindrical lenses 971 from becoming uneven in the longer direction to improve uniformity in height of each of the cylindrical lenses 971 in the longer direction. Also, when the surface layer 961 of the spacer layer 96 is formed, the transparent ink immediately after the ejection onto the main body part 960 of the spacer layer 96 is not irradiated with the ultraviolet (or irradiated with the ultraviolet at smaller intensity than the intensity of the ultraviolet irradiated at the time of forming the main body part 960), and thereby the thickness of the spacer layer 96 can be made uniform with accuracy. As a result, the cylindrical lenses 971 can be easily formed. Further, the visual effect provided to the image on the base material 9 can be improved.

In addition, in the formation of the spacer layer 96 of the lens layer 95, if the surface can be made almost smooth when the main body part 960 is formed, the surface layer 961 may be omitted. In this case, the intensity of the ultraviolet irradiated from the curing part 33 at the time of forming the microlens layer 97 is set smaller than the intensity of the ultraviolet irradiated from the curing part 33 at the time of forming the spacer layer 96.

As described above, the inkjet printer 1 can easily form the microlens layer 97 and spacer layer 96 of the lens layer 95 with use of the transparent ink. For this reason, the inkjet printer 1 is used to form the lens layer 95 on any of various base materials 9; however, the inkjet printer 1 is particularly suitable for forming the lens layer 95 on a plate-like or sheet-like base material 9 having flexibility, on which it is relatively difficult to form a lenticular lens by another method. Also, the transparent ink used to form the lens layer 95 is the flexible ink, and therefore deformation of the base material 9 is suppressed from being interfered by the lens layer 95. Accordingly, the inkjet printer 1 is particularly suitable for forming the lens layer 95 on a thin sheet-like (i.e., film-like) base material 9 that is as used to wrap a body of a vehicle, a train, or the like and easily deformed.

In addition, in the above first embodiment, as the base material 9 serving as the printing object, a material preliminarily printed with the multi-view image on a surface thereof by another printer or the like is used; however, the inkjet printer 1 can also print the multi-view image. In this case, before Step S1 in FIG. 3, the colored ink ejection part 32, curing part 33, and head moving mechanism 4 are controlled by the print control part 5; the colored ink ejection part 32 continuously moves in the (+X) direction while ejecting the colored inks; and the colored inks ejected from the curing part 33 on the (−X) side, which moves together with the colored ink ejection part 32, onto the base material 9 are irradiated with the ultraviolet to cure the colored inks. The colored ink ejection part 32 moves in the (+Y) direction a predetermined distance after arriving at the (+X) side of the base material 9. Subsequently, the colored ink ejection part 32 continuously moves in the (−X) direction and the colored inks ejected onto the base material 9 are cured by the ultraviolet from the curing part 33 on the (+X) side. The colored ink ejection part 32 moves a predetermined distance in the (+Y) direction after arriving at the (−X) side of the base material 9. In the inkjet printer 1, the X direction main scanning and Y direction sub scanning of the colored ink ejection part 32 and curing parts 33 are repeated, and thereby as illustrated in FIG. 4 (A), on the upper surface 91 of the base material 9, the image layer 93 based on the colored inks is formed. In this case, a thickness of the colored inks used to print the multi-view image is also set to a thickness that enables the colored inks to be completely cured by the ultraviolet irradiation. As described, if the inkjet printer 1 is configured to eject the colored inks from the head unit 3 to form the image layer 93 on the base material 9 and eject the transparent ink from the head unit 3 to form the lens layer 95, when the lens layer 95 is formed, the image layer 93 on the base material 9 and the transparent ink ejection part 31 of the head unit 3 can be easily aligned with each other with high accuracy. As a result, alignment of the lens layer 95 with the image layer 93 can be easily achieved with high accuracy.

Also, the printing of the multi-view image may be first performed on the whole of the base material 9, and then on the whole of the base material 9, the lenticular lens may be formed; however, the printing can also be performed as follows. That is, the colored ink ejection part 32 ejects the colored inks to print the image with the head unit continuously moving in the (+X) direction; then the transparent ink ejection part 31 ejects the transparent ink to form and cure the undercoat layer with the head unit continuously moving in the (−X) direction; and then the head unit moves in the (+Y) direction.

Figure 6:
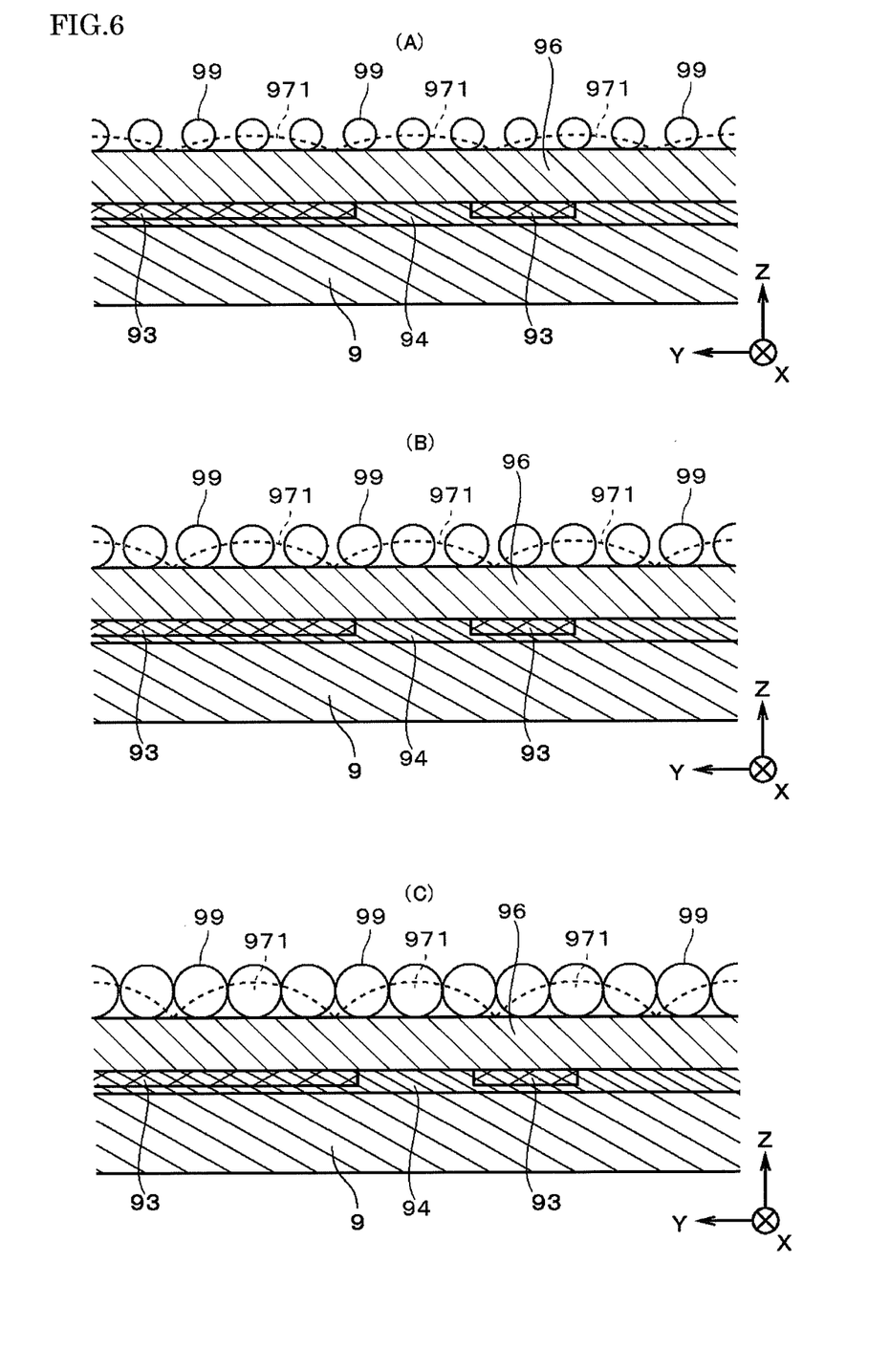
FIG. 6 is a cross-sectional view illustrating the formation step of the lens layer.

Meanwhile, when the microlens layer 97 is formed by the inkjet printer 1, on the basis of a size (width and height) and surface shape of each of the plurality of cylindrical lenses 971, the transparent ink ejection part 31 is controlled by the print control part 5 to change a size of the microdroplets of the transparent ink ejected from the transparent ink ejection part 31. FIGS. 6 (A) to (C) are cross-sectional views illustrating sizes and surface shapes of the cylindrical lenses 971 in the case where the size of the microdroplets of the transparent ink is changed. In FIGS. 6 (A) to (C), the microdroplets 99 are not parallel shaded (the same holds for FIG. 7). FIGS. 6 (A) to (C) provide the illustrations on the assumption that the ejection port group corresponding to one cylindrical lens 971 is provided with three ejection ports, and three microdroplets 99 indicated by solid lines in each of the cross-sectional views form one cylindrical lens 971 indicated by a dashed line.

In respective examples illustrated in FIGS. 6 (A) to (C), the microdroplet 99 in FIG. 6 (A) is the smallest, and the microdroplet 99 in FIG. 6 (C) is the largest. For this reason, the cylindrical lens 971 in FIG. 6 (A) is the smallest (i.e., a height from the image layer 93 is low), and curvature at the center in the Y direction corresponding to the width direction is also the smallest. On the other hand, the cylindrical lens 971 in FIG. 6 (C) is the largest, and curvature at the center in the Y direction is also the largest. As described, by changing the size of the microdroplets of the transparent ink on the basis of the size and surface shape of each of the plurality of cylindrical lenses 971, the cylindrical lenses 971 having various characteristics (e.g., different focal length) can be easily formed.

Figure 7:
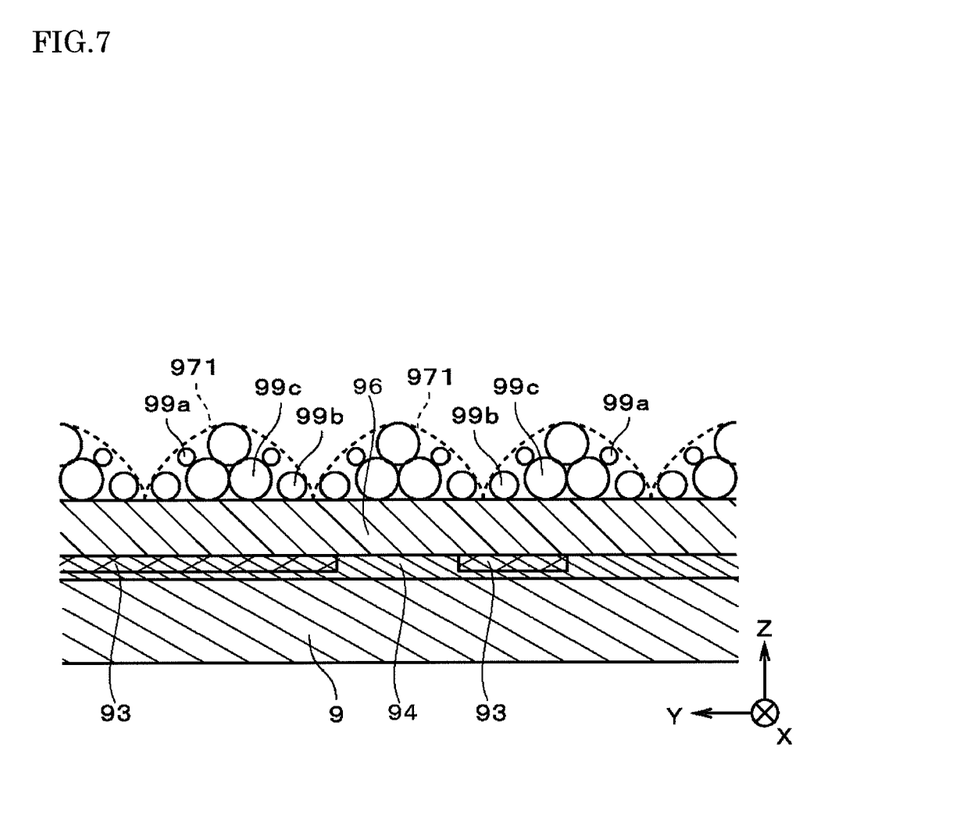
FIG. 7 is a cross-sectional view illustrating a formation step of the lens layer.

In each of the examples illustrated in FIGS. 6 (A) to (C), each of the cylindrical lenses 971 is formed by the microdroplets 99 of the transparent ink having the same size; however, each of the cylindrical lenses 971 may be, as illustrated in FIG. 7, formed by microdroplets of the transparent ink having a plurality of sizes. In FIG. 7, the microdroplets 99a to 99c of the transparent ink, which are ejected onto respective positions on the image layer 93 and have mutually different sizes, are illustrated as circles. In practice, these microdroplets 99a to 99c are connected to form into each of the cylindrical lenses 971 each having a surface shape indicated by a dashed line. In the inkjet printer 1, when the cylindrical lenses 971 are formed, by decreasing in size the microdroplets 99a and 99b of the transparent ink ejected to positions close to positions to become part of the surface of each of the cylindrical lenses 971, and increasing in size the microdroplet 99c of the transparent ink ejected to a position distant from a position to become part of the surface of the cylindrical lens 971, without significantly increasing the number of microdroplets of the transparent ink necessary to form each of the cylindrical lenses 971, the cylindrical lenses 971 can be formed with accuracy in shape.

Figure 8:
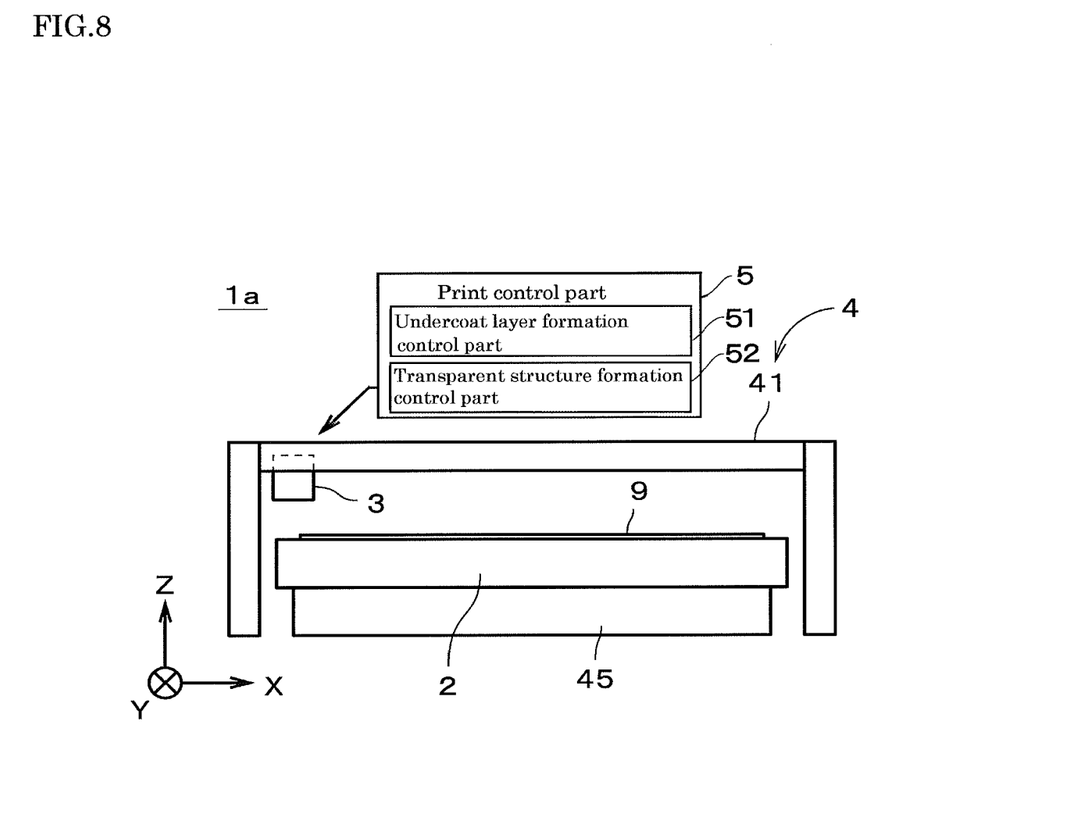
FIG. 8 is a front view of an inkjet printer according to a second embodiment.

Next, an inkjet printer as a printer according to a second embodiment of the present invention is described. FIG. 8 is a front view illustrating the inkjet printer 1a according to the second embodiment. In the inkjet printer 1a, from the inkjet printer 1 illustrated in FIG. 1, the sub scanning mechanism that moves the head unit 3 in the Y direction corresponding to the sub scanning direction is omitted, and on a lower side ((−Z) side) of a holding part 2 that holds a base material 9, a holding part moving mechanism 45 that moves the holding part 2 in the sub scanning direction is provided. The rest of a configuration of the inkjet printer 1a is the same as that of the inkjet printer 1 illustrated in FIGS. 1 and 2, and in the following description, corresponding components are denoted by the same symbols.

In the formation of an image layer 93 and lens layer 95 by the inkjet printer 1a (see FIGS. 4 and 5), in place of the sub scanning of the head unit 3 performed every one main scanning of the head unit 3, the base material 9 is moved a predetermined distance in the sub scanning direction together with the holding part 2. The rest of operation is the same as that in the first embodiment. As in the first embodiment, the inkjet printer 1a can easily provide a visual effect to an image on the base material 9 by forming an undercoat layer 94 and the lens layer 95 provided with a spacer layer 96 and a microlens layer 97 on the image layer 93 of the base material 9.

Figure 9:
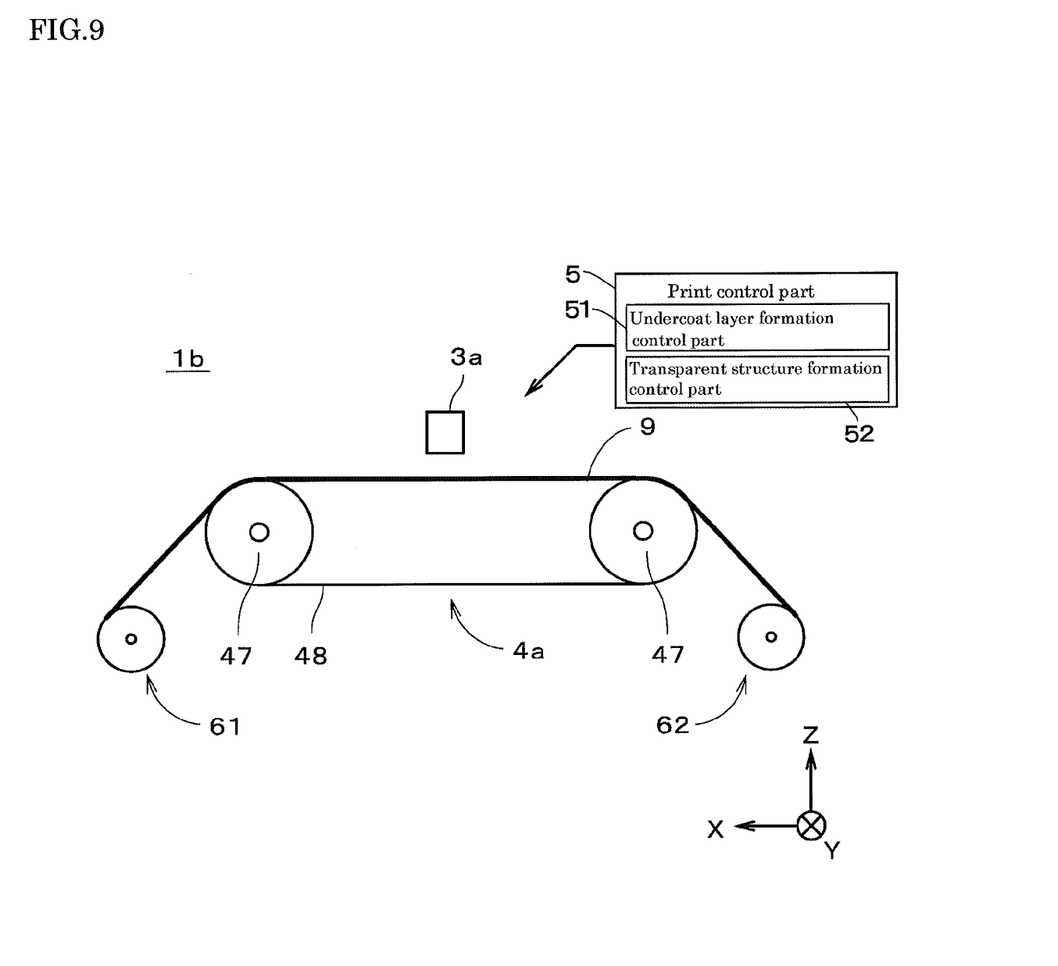
FIG. 9 is a front view of an inkjet printer according to a third embodiment.

Next, an inkjet printer as a printer according to a third embodiment of the present invention is described. FIG. 9 is a front view illustrating the inkjet printer 1b according to the third embodiment. The inkjet printer 1b is provided with: a head unit 3a; a feeding mechanism 4a that moves a base material 9 in an (−X) direction below (on a (−Z) side of) the head unit 3a; and a print control part 5.

The feeding mechanism 4a has: two belt rollers 47 connected to an unillustrated motor; and a belt 48 stretched between the two belt rollers 47. Also, on a (+X) side and the (−Z) side of the feeding mechanism 4a, a supply part 61 that holds the roll-like base material 9 (supply roll) is provided, and on a (−X) side and the (−Z) side of the feeding mechanism 4a, a winding part 62 that holds the roll-like base material 9

(wound roll) is provided. The base material 9 drawn out of the supply part 61 is held on the belt 48 serving as a holding part; passes below the head unit 3a together with the belt 48 to move to a (−X) side; and is wound by the winding part 62. In the following description, when being simply referred to as the base material 9, it refers to a site in the middle of conveyance (i.e., a site of the base material 9 on the belt 48).

Figure 10:
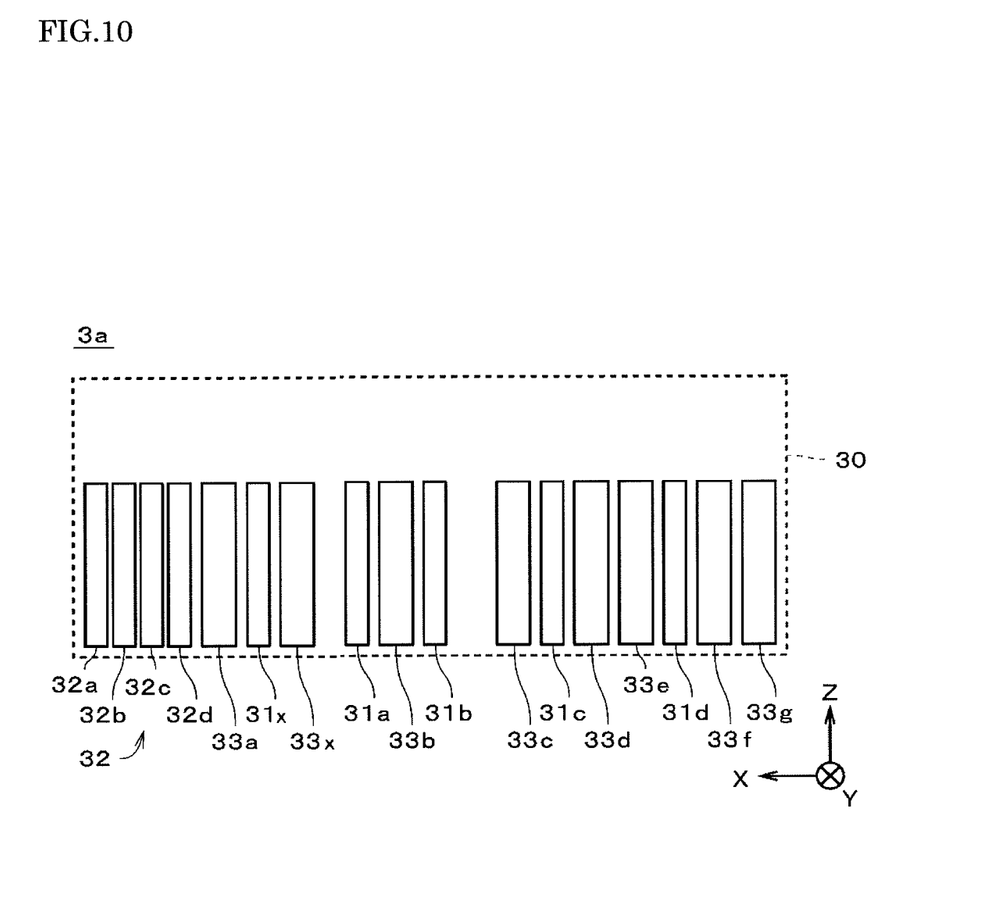
FIG. 10 is diagram illustrating an internal configuration of a head unit.

FIG. 10 is a diagram illustrating an internal configuration of the head unit 3a. In FIG. 10, a cover 30 of the head unit 3a is drawn by a dashed line. On the most (+X) side (leftmost side) of the head unit 3a, a colored ink ejection part 32 provided with four ejection mechanisms 32a to 32d is arranged, and on a (−X) side of the colored ink ejection part 32, a curing part 33a that emits ultraviolet is arranged. On a (−X) side of the curing part 33a, a transparent ink ejection part 31x (first ejection part) is arranged, and on a (−X) side of the transparent ink ejection part 31x, a curing part 33x (first curing part) that emits ultraviolet is arranged. The transparent ink ejection part 31x and curing part 33x are intended to form an undercoat layer as will be described later, and constitute an undercoat layer forming part. Further, on a (−X) side of the curing part 33x, four transparent ink ejection parts 31a to 31d (second ejection part) are arranged, and on (−X) sides of the transparent ejection parts 31a to 31d, six curing parts 33b to 33g (second curing part) that emit ultraviolet are respectively arranged. The transparent ink ejection parts 31a to 31d and curing parts 33b to 33g are intended to form a lenticular lens, and constitute a transparent structure forming part. Note that the four ejection mechanisms 32a to 32d of the colored ink ejection part 32, the transparent ink ejection parts 31a to 31d, and 31x, and the curing parts 33a to 33g, and 33x are provided over the entire width of the base material 9 (i.e., over the entire length in a Y direction), and over the entire width of the base material 9 passing below the head unit 3a, colored inks and transparent ink are ejected, and also the ultraviolet is irradiated.

A formation step of a printed material 90 by the inkjet printer 1b is almost the same as that in the first embodiment, and therefore referring to FIGS. 4 and 5, the formation step is described below. In the following description, part of the base material 9 is focused on, and processing steps performed on the part are sequentially described. In the inkjet printer 1b, first, the colored inks are ejected from the colored ink ejection part 32 onto the base material 9 moving in the (−X) direction, and the colored inks are irradiated with the ultraviolet from the curing part 33a and thereby completely cured to form an image layer 93 (see FIG. 4 (A)). Subsequently, to form the undercoat layer, the transparent ink is ejected from the transparent ink ejection part 31x onto the base material 9. Parts where the image layer 93 is formed are formed with the radiation-curable (ultraviolet-curable) colored inks; however, an image in the image layer 93 is a halftone image, which means that the colored ink layer is not formed without any gap, so that the undercoat layer should be formed even in the parts where the image layer 93 is present, and therefore the transparent ink is ejected onto the entire part where the lenticular lens to be formed. Then, the transparent ink is cured by the ultraviolet irradiated from the curing part 33x, and thereby the undercoat layer 94 is completely cured and formed. Operation for forming the undercoat layer 94 is controlled by an undercoat layer formation control part 51 in the print control part 5.

Then, from the transparent ink ejection part 31a, the transparent ink is ejected onto the image layer 93 and undercoat layer 94, and cured by the ultraviolet irradiated from the curing part 33b to form a main body part 960 of a spacer layer 96 (see FIG. 4 (C)). Subsequently, onto the main body part 960, the transparent ink is ejected from the transparent ink ejection part 31b. In the head unit 3, a distance in an X direction between the transparent ink ejection part 31b and the curing part 33c is relatively large, so that the transparent ink provided on the main body part 960 spreads around before being cured by ultraviolet irradiation, and flows into concave portions of a surface of the main body part 960 to form into a surface layer 961. After that, the surface layer 961 is cured by ultraviolet irradiation by the curing part 33c to form the spacer layer 96 having a smooth surface and an almost uniform thickness (see FIG. 5 (A)).

After the spacer layer 96 has been formed, the transparent ink is ejected from the transparent ink ejection part 31c, and from the curing part 33d, the ultraviolet is irradiated at relatively weak intensity (approximately 5% to 10% of intensity of the ultraviolet from each of the curing parts 33b, 33c, 33e, and 33g) to thereby form a plurality of cylindrical lenses 971 that are alternately arrayed and in a semi-cured state (see FIG. 5 (B)). Then, the cylindrical lenses 971 in the semi-cured state are irradiated with the ultraviolet at the normal intensity by the curing part 33e and thereby cured.

Subsequently, onto parts between the plurality of already formed cylindrical lenses 971, the transparent ink is ejected from the transparent ink ejection part 31d, and a plurality of cylindrical lenses 971 in the semi-cured state are formed by the ultraviolet having relatively weak intensity (the same intensity as that of the ultraviolet from the curing part 33) from the curing part 33f (see FIG. 5 (C)). Then, the cylindrical lenses 971 are cured by the ultraviolet having the normal intensity from the curing part 33g, and the formation of a microlens layer 97 is completed (i.e., the formation of a lens layer 95 is completed). In addition, operation for forming the lens layer 95 is controlled by a transparent structure formation control part 52 in the print control part 5.

As described, in the inkjet printer 1b, on the basis of one movement of the base material 9 in the (−X) direction, the colored ink ejection part 32 and transparent ink ejection parts 31a to 31d, and 31x pass through respective positions on the base material 9 only once to complete printing on the base material 9. That is, printing not involving the movement of the head unit 3a and base material 9 in the Y direction (so-called one-pass printing) is performed. As in the first embodiment, the inkjet printer 1b can easily provide a visual effect to the image on the base material 9 by forming the lens layer 95 provided with the spacer layer 96 and the microlens layer 97 on the image layer 93 of the base material 9.

Note that, in any of the above-described embodiments, it is better to make each of distances between the transparent ink ejection part 31 and the curing parts 33 and 33 on the both sides of the transparent ink ejection part 31 for forming the undercoat layer 94 (see FIG. 2), or a distance between the transparent ink ejection part 31x and the curing part 33x (see FIG. 10) as narrow as possible to make a period of time from the ejection of the transparent ink from the transparent ink ejection part 31 or 31x to the irradiation of the ultraviolet onto the transparent ink as short as possible. This is because it is desirable to irradiate the ultraviolet early to completely solidify the ejected transparent ink while soaking of the transparent ink into the base material 9 is as shallow as possible. In FIG. 10, the distance between the transparent ink ejection part 31x and the curing part 33x is illustrated just like the other distances; however, in practice, it is desirable to make the distance shorter than a distance between any of the other transparent ink ejection parts or the colored ink ejection part and a corresponding curing part, and if possible, it is desirable to make the transparent part 31x and the curing part 33x adjacent to each other. Also, the head unit 3 illustrated in FIG.

2 is desirably configured to, for example, in addition to the illustrated transparent ink ejection part 31, be provided with another transparent ink ejection part 31 between the curing part 33 on the other side ((X) side) and the colored ink ejection part 32*a*; make the curing parts 33 and the corresponding transparent ink ejection parts 31 adjacent to each other; and depending on a scanning direction of the head unit 3, be able to irradiate the ultraviolet from a corresponding one of the curing parts 33 immediately after the ejection of the transparent ink. Also, in order to completely solidify the ejected transparent ink early while the soaking of the transparent ink into the base material 9 is as shallow as possible, it is desirable to, as the curing part 33*x*, use a curing member that emits ultraviolet having highest power. Also, as the curing parts 33 and 33, high power members are respectively used, and in particular, to solidify the undercoat layer 94, the members are used at high power.

As described, in the case of desiring to form the lenticular lens or perform pseudo-embossment printing with the transparent ink, by forming the undercoat layer 94 with the same transparent ink, even if some gaps or small holes occur in the undercoat layer, an amount of the ink passing through the holes is very small, and the ink is cured without penetrating so deeply, so that the transparent ink can be blocked from running toward a back surface.

In the above, the embodiments of the present invention have been described; however, the present invention is not limited to any of the above-described embodiments, but can be variously modified.

In any of the above-described embodiments, the lenticular lens is formed in order to perform the 3D printing; however, in order to perform other printing, for example, the pseudo-embossment printing, a transparent structure can also be formed. In order to perform the pseudo-embossment printing, it is only necessary to, in place of the lenticular lens, print and form the transparent structure serving as a pseudo-embossment with the transparent ink in a necessary location on a printing object. FIGS. 4 and 5 illustrate as if over the entire surface of the base material 9, the undercoat layer 94 is formed; however, it is only necessary to form the undercoat layer only in a location where the lenticular lens is desirably formed or the pseudo-embossment printing is desirably performed. Also, the transparent ink or each of the colored inks may be ink that is, for example, cured by visible light (photons) irradiation or electron beam (electrons) irradiation. That is, various inks may be used if they are quickly cured by irradiation of radiation that is an electromagnetic wave or particle beams. Further, the colored ink ejection part 32 may eject inks respectively having colors (e.g., light cyan, light magenta, and white) other than black, cyan, magenta, and yellow.

Also, in any of the above-described embodiments, both of the undercoat layer and the transparent structure are formed by an inkjet method; however, the present invention is not limited to this. For example, the present invention may be configured to perform printing on the basis of plate printing in a necessary location with use of ultraviolet-curable ink and thereby supply and form the undercoat layer, or perform coating over the entire surface of the base material on the basis of roller coating and thereby supply and form the undercoat layer. Also, in the inkjet printer, it is only necessary that the head unit and the base material 9 are moved relative to each other by various types of moving mechanisms. In other words, it is only necessary that at least one of the head unit and the base material 9 is moved relative to the other. In the above-described inkjet printer 1, the head moving mechanism 4 that moves the head unit 3 in the X and Y directions corresponds to the moving mechanism. Also, in the inkjet printer 1*a*, the head moving mechanism 4 that moves the head unit 3 in the X direction and the holding part moving mechanism 45 that moves the base material 9 in the Y direction together with the holding part 2 respectively correspond to the above moving mechanisms, and in the inkjet printer 1*b*, the feeding mechanism 4*a* that moves the base material 9 in the X direction corresponds to the above moving mechanism.

The inkjet printer is suitable for printing on a sheet-like or plate-like base material having flexibility formed of paper, cloth, plastic, or the like; however, the present invention is particularly preferable for the 3D printing or pseudo-embossment printing on plain paper, cloth, or the like having penetrability for radiation-curable ink. Also, in the inkjet printer, the colored ink ejection part may be omitted from the head unit, and only the lens layer 95 may be formed. In this case, the image layer 93 is formed on the base material 9 by another printer, and by the inkjet printer, the image layer 93 and the head unit are aligned and then the lens layer 95 is formed.

EXPLANATIONS OF REFERENCE NUMERALS

1, 1*a*, 1*b*: Inkjet printer
4: Head moving mechanism
4*a*: Feeding mechanism
5: Print control part
9: Base material
31, 31*a* to 31*d*, 31*x*: Transparent ink ejection part
32: Colored ink ejection part
33, 33*a* to 33*g*, 33*x*: Curing part
41: Main scanning mechanism
42: Sub scanning mechanism
45: Holding part moving mechanism
51: Undercoat layer formation control part
52: Transparent structure formation control part
90: Printed material
99, 99*a* to 99*c*: Microdroplet
93: Image layer
94: Undercoat layer
95: Lens layer
96: Spacer layer
97: Microlens layer
971: Cylindrical lens
S1, 2, 11 to S17: Step

What is claimed is:

1. A printing method comprising:
   with respect to printing paper having, a characteristic of being penetrated by radiation-curable ink, an undercoating step of using a first amount of radiation-curable transparent ink to form a thin undercoat layer;
   an undercoat curing step of irradiating the formed undercoat layer with radiation of a first intensity to completely solidify the formed undercoat layer;
   a transparent structure forming step of using a second amount of the radiation-curable transparent ink to form a desired transparent structure on the solidified undercoat layer, wherein the second amount is greater than the first amount; and
   a transparent structure curing step of afterward further irradiating the radiation of a second intensity to cure the formed transparent structure, wherein the second intensity is less than the first intensity.

2. The printing method according to claim 1, wherein the transparent structure is a lenticular lens or a pseudo-embossment.

3. The printing method according to claim 1, wherein the undercoat layer is formed so as to have a thickness of 10 μm or less.

4. The printing method according to claim 1, wherein the undercoat layer formed in the undercoating step has a uniform thickness resulting from the ink penetrating through the printing paper.

5. The printing method according to claim 1 or 2, wherein the transparent structure curing step comprises: a first curing step of irradiating relatively weak radiation to shape the transparent structure as being in a semi-cured state; and a second curing, step of, after the first curing step, irradiating relatively strong radiation to completely cure the transparent structure.

6. A printer, comprising:
an ejection part that ejects a microdroplet of radiation-curable transparent ink toward a base material;
a moving mechanism that moves the ejection part and the base material relative to each other;
a curing part that irradiates the transparent ink provided on the base material from the ejection part with radiation to cure the transparent ink; and
a print control part that controls the ejection part, the moving mechanism, and the curing part, wherein the print control part comprises:
a transparent structure formation control part that supplies a predetermined amount of the transparent ink to the base material, then irradiates the transparent ink with radiation of a first intensity to cure the transparent ink, and thereby forms a transparent structure on the base material; and
an undercoat layer formation control part that supplies to the base material the transparent ink having a smaller amount than the predetermined amount in the transparent structure formation control part, then irradiates the transparent ink with radiation of a second intensity to cure the transparent ink, and thereby forms an undercoat layer of the transparent ink on the base material, wherein the second intensity is greater than the first intensity.

7. The printer according to claim 6, wherein: the transparent structure has a lens layer including a spacer layer and a microlens layer; and intensity of the radiation irradiated from the curing part at a time of forming, the microlens layer is smaller than intensity of the radiation irradiated from the curing part at a time of forming the spacer layer.

8. A printer, comprising:
an undercoat layer forming part that has a first supply part supplying radiation-curable transparent ink to a base material, and a first curing part irradiating the transparent ink supplied by the first supply part with radiation to cure the transparent ink, and forms an undercoat layer based on the transparent ink;
a transparent structure forming part that has a second supply part ejecting a microdroplet of radiation-curable transparent ink toward the base material, and a second curing part irradiating the transparent ink ejected by the second supply part with radiation to cure the transparent ink, and forms a transparent structure based on the transparent ink, a moving mechanism that moves the undercoat layer forming part and the transparent structure forming part relative to the base material; and
a print control part that controls the undercoat layer forming part, the transparent structure forming part, and the moving mechanism wherein the print control part comprises:
a transparent structure formation control part that supplies a predetermined amount of the transparent ink from the transparent structure forming part to the base material, then irradiates the transparent ink with the radiation of a first intensity to cure the transparent ink, and thereby forms the transparent structure on the base material; and
an undercoat layer formation control part that supplies the transparent ink having a smaller amount than the predetermined amount by the transparent structure formation control part from the undercoat layer forming part to the base material, then irradiates the transparent ink with the radiation of a second intensity to cure the transparent ink, and thereby forms the undercoat layer of the transparent ink on the base material, wherein the second intensity is greater than the first intensity.

9. The printer according to claim 8, wherein: the transparent structure has a lens layer including a spacer layer and a microlens layer; and intensity of the radiation irradiated from the second curing part at a time of forming the microlens layer is smaller than intensity of the radiation irradiated from the second curing part at a time of forming the spacer layer.

10. A printer according to claim 6 or 8, further comprising another ejection part that ejects a microdroplet of colored ink toward the base material to form an image layer.

* * * * *